US009851992B2

(12) United States Patent
Tsirkin et al.

(10) Patent No.: US 9,851,992 B2
(45) Date of Patent: Dec. 26, 2017

(54) PARAVIRTULIZED CAPABILITY FOR DEVICE ASSIGNMENT

(71) Applicant: Red Hat Israel, Ltd., Raanana (IL)

(72) Inventors: Michael Tsirkin, Yokneam (IL); Alex Williamson, Fort Collins, CO (US)

(73) Assignee: Red Hat Israel, Ltd., Raanana (IL)

( * ) Notice: Subject to any disclaimer, the term of this patent is extended or adjusted under 35 U.S.C. 154(b) by 1166 days.

(21) Appl. No.: 13/956,730

(22) Filed: Aug. 1, 2013

(65) Prior Publication Data

US 2015/0040124 A1 Feb. 5, 2015

(51) Int. Cl.
G06F 9/455 (2006.01)
(52) U.S. Cl.
CPC .................. *G06F 9/4555* (2013.01)
(58) Field of Classification Search
None
See application file for complete search history.

(56) References Cited

U.S. PATENT DOCUMENTS

| 2007/0061441 | A1 | 3/2007 | Landis et al. |
| 2008/0294808 | A1 | 11/2008 | Mahalingam et al. |
| 2011/0119423 | A1 | 5/2011 | Kishore et al. |
| 2011/0239213 | A1 | 9/2011 | Aswani et al. |
| 2011/0296411 | A1 | 12/2011 | Tang et al. |
| 2012/0033673 | A1 | 2/2012 | Goel |
| 2012/0072669 | A1 | 3/2012 | Nishiguchi |
| 2012/0084487 | A1* | 4/2012 | Barde ............... G06F 9/45541 711/6 |
| 2012/0191940 | A1* | 7/2012 | Brownlow ......... G06F 12/0684 711/172 |
| 2014/0181808 | A1* | 6/2014 | Sahota ............... G06F 9/45545 718/1 |

OTHER PUBLICATIONS

Yi, D., Yan, Y. H., & Li, L. (Dec. 2012). A new I/O device virtualization modelon Xen. In Wavelet Active Media Technology and Information Processing (ICWAMTIP), 2012 International Conference on (pp. 406-409). IEEE. 4 pages.

* cited by examiner

*Primary Examiner* — Kenneth Tang
(74) *Attorney, Agent, or Firm* — Lowenstein Sandler LLP

(57) ABSTRACT

A hypervisor of a host detects a request by a guest or a hypervisor administrator to expose a device associated with the host to the guest. The hypervisor locates free space in a configuration space of the device. The hypervisor assigns a configuration space associated with the hypervisor to the located free space. The hypervisor notifies the guest of the configuration space associated with the hypervisor and a range of addresses associated with the free space. The hypervisor exposes the device to the guest. The configuration space associated with the hypervisor may be a message-signaled capability associated with the hypervisor.

20 Claims, 5 Drawing Sheets

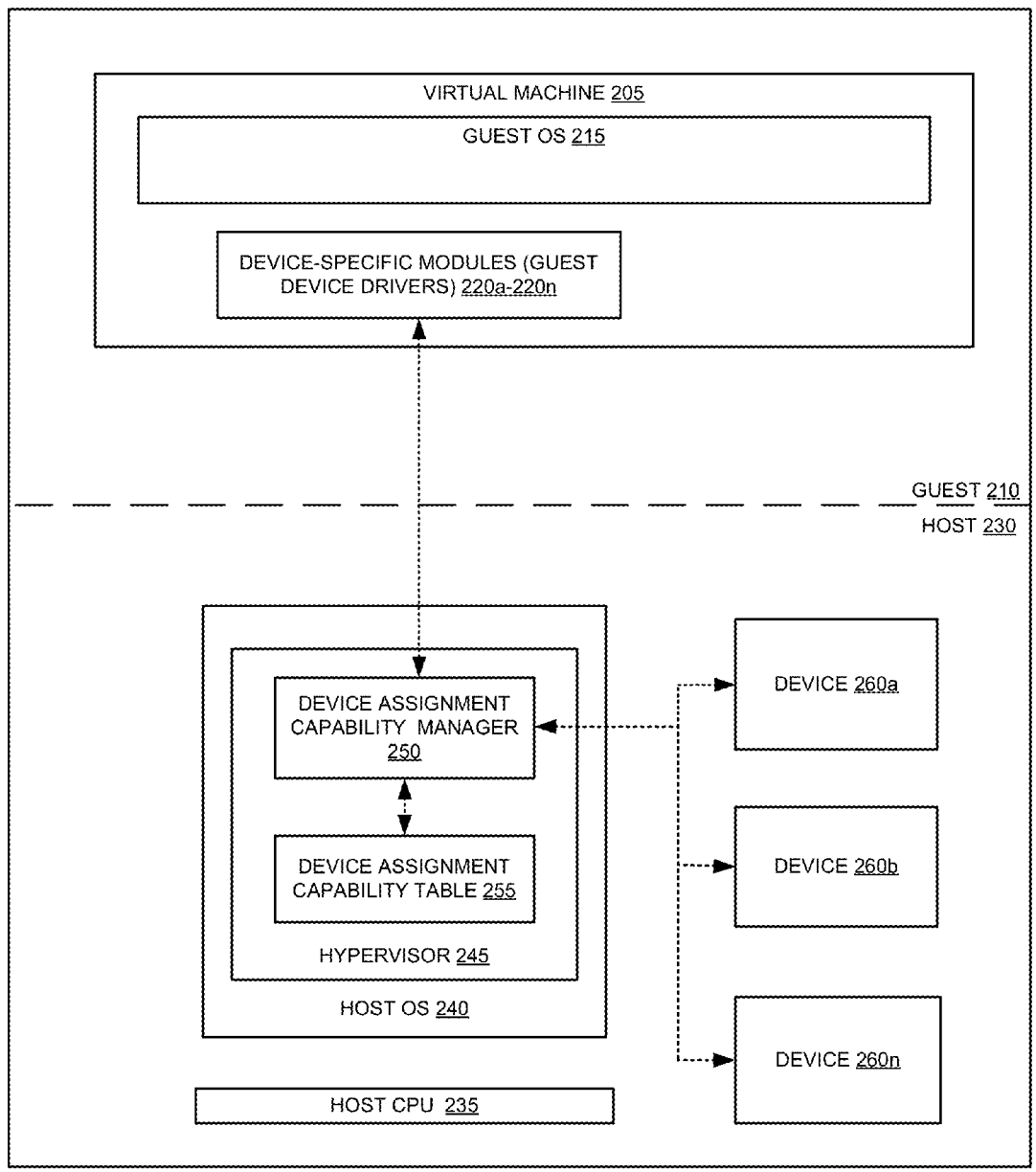

DEVICE CAPABILITY TABLE (e.g., Device 160b (PCI or PCIe))

| | Capability Identifier (Device) 305a | Next Capability Address 310a | Message Address Register 315a |
|---|---|---|---|
| 319a | | | |
| 319b | Capability Identifier (Device) 305b | Next Capability Address 310a | Message Address Register 315b |
| | . . . . | . . . . | . . . . |
| 319n-319z | Capability Identifier (Hypervisor) 305n-305z | Next Capability Address 310n-310z | Message Address Register 315n-315z |
| | . . . . | . . . . | . . . . |

DEVICE ASSIGNMENT CAPABILITY TABLE 155

| Device Identifier 320a | Device Capability Identifier 325a | Message Address Register 330a |
|---|---|---|
| Device Identifier 320b | Device Capability Identifier 325b | Message Address Register 330b |
| . . . . | . . . . | . . . . |
| Device Identifier 320n | Device Capability Identifier 325n | Message Address Register 330n |

FIGURE 3B

PARAVIRTULIZED CAPABILITY FOR DEVICE ASSIGNMENT

TECHNICAL FIELD

Embodiments of the present disclosure relate to a computer system, and more specifically, to permit a guest to have direct access to a physical device using a hypervisor.

BACKGROUND

Virtualization permits multiplexing of an underlying host machine between different virtual machines. The host machine allocates a certain amount of its resources to each of the virtual machines. Each virtual machine may then use the allocated resources to execute applications, including operating systems (referred to as guest operating systems (OS)). The software layer providing the virtualization is commonly referred to as a hypervisor and is also known as a virtual machine monitor (VMM), a kernel-based hypervisor, or a host operating system.

Currently, a virtual machine may access a device under the control of the host computer using three methods: device assignment, device emulation, and paravirtualization. In device assignment or pass through, a guest is granted access by a hypervisor to a device without intervention by the hypervisor or an attempt to access may be trapped by the hypervisor, but the hypervisor forwards the access requests to the device unchanged. In device emulation, a guest does not know that a hypervisor is present. The hypervisor emulates the underlying hardware of the host computer, rendering use of the virtual machine transparent to the guest operating system and the user of the computer. The guest operating system "believes" that a physical device is present and loads a virtual device driver for it, where the hypervisor traps attempted accesses to underlying physical devices and instead modifies or emulates the virtual devices of the guest and executes an appropriate command on the physical device on behalf of the guest.

In paravirtualization, the guest knows that a hypervisor is present. The guest operating system includes a module or a driver which is specific to the hypervisor. The guest detects that it is running on the hypervisor and then the hypervisor loads the specific device driver (i.e., a guest device driver). As with device emulation, with paravirtualization, accesses are interpreted by the hypervisor and executed on behalf of a guest.

Overhead is smallest and interaction fastest using device assignment with physical hardware. However, once device assignment/pass through is enabled between the guest device driver and a device, there is no easy way for the guest device driver to communicate with the hypervisor. In certain circumstances, it may be necessary for the guest device driver to request an action on the part of the hypervisor. For example, the host may control a plurality of devices that are a mixture of physical or paravirtualized devices, and it may be desirable for a guest device driver to execute an action on all of physical or paravirtualized devices at the same time. In another example, the guest device driver may need to detect a sudden or "hot" unplugging of two peripheral devices at the same time. Traditional PCI devices do not communicate or coordinate their actions with each other. In both examples, special commands are needed to permit a hypervisor to perform actions or handle interrupts on/from two or more devices simultaneously. This reintroduces complexity and additional overhead in a guest device driver, rending the advantages of assignment/pass moot.

BRIEF DESCRIPTION OF THE DRAWINGS

FIG. 2 is a block diagram that illustrates an example computing system in which examples of the present disclosure may operate.

FIG. 3A shows a device capability table having a used configuration space and an unused configuration space of an individual device.

FIG. 3B shows an example of a device assignment capability table that a hypervisor may maintain corresponding to a plurality of devices.

DETAILED DESCRIPTION

Figure 1:
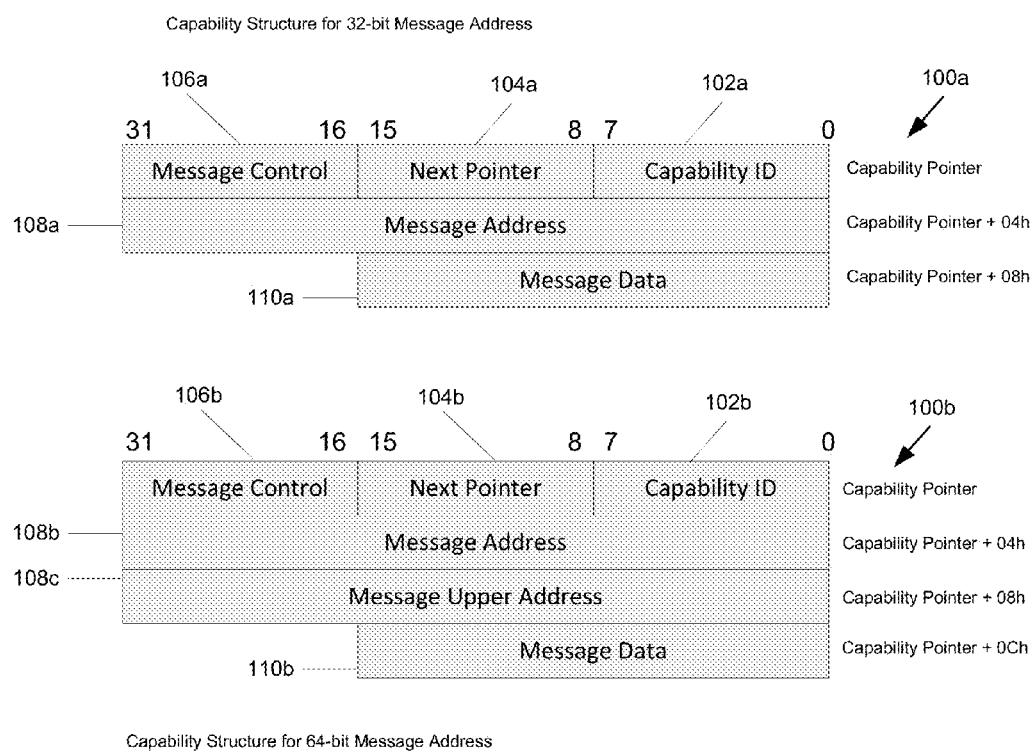
FIG. 1 shows example formats of message-signaled interrupt capability tables associated with MSI interrupts or programmable configurations of PCI devices, respectively.

Methods and systems for permitting a guest device driver to have a communication channel with a hypervisor associated with a device and to have direct access to a physical device though the hypervisor are disclosed. A hypervisor of a host detects a request (e.g., by a hypervisor administrator or a guest) to expose a device associated with the host to the guest. The hypervisor may be configured to expose the device to the guest on hypervisor startup. Exposing a device to a guest refers to making a device available for use by the guest. The hypervisor locates free space in a configuration space of the device. The hypervisor assigns a configuration space associated with the hypervisor to the located free space. The hypervisor notifies the guest of the configuration space associated with the hypervisor and a range of addresses associated with the free space. The configuration space associated with the hypervisor may be used to specify, for example, a message-signaled interrupt (MSI) capability associated with the hypervisor. A capability may refer to a data structure for permitting operating system software to enable a device to transmit message-signaled interrupts. In an example, the configuration space may be PCI configuration space or PCI express extended configuration space. In an example, the configuration space of the device may be apportioned into at least one message-signaled interrupt vector.

In an example, the hypervisor may determine an unused capability (empty slots or space in the capability portion) in the configuration space of the device. Determining an unused capability may comprise loading a device-specific module in the hypervisor and scanning configuration space of the device pointed to by the device-specific module. In another example, determining an unused capability may comprise inserting a capability of the hypervisor in a linked list of capabilities associated with the configuration space of the device.

In an example, the hypervisor may insert a capability of the hypervisor in a linked list of capabilities associated with the configuration space of the device. The hypervisor may traverse though the capability linked list associated with the configuration space of the device until a termination identifier of the linked list is found. The hypervisor may replace the termination identifier in the configuration space of the device exposed to the guest with a pointer to the capability of the hypervisor. The termination identifier may be part of a previous capability.

In an example, the hypervisor may intercept a write by the guest to the range of addresses associated with the free space.

In an example, the hypervisor may execute a hypervisor-specific instruction in response to intercepting a write by the guest to the range of addresses associated with the configuration space allocated to the hypervisor capability. The hypervisor-specific instruction may be an operation associated with the device. The hypervisor-specific instruction may provide a communication channel between the guest and the hypervisor.

In an example, a two-way communication channel may be established between the guest and an exposed device. The hypervisor may expose the guest to at least one more message-signaled interrupt vector for use with the hypervisor beyond a reserved set of message-signaled interrupt vectors in the configuration space of the device. In response to an access of a data structure enabling at least one more message-signaled interrupt vector in the hypervisor message-signaled interrupt capability, the hypervisor may intercept the access and enable the message-signaled interrupt. Later, when at least one of a hypervisor-related event, a host related event, or a device related event is raised, the hypervisor can detect that the message-signaled interrupt is enabled and can notify the guest about at least one of a hypervisor-related event, a host related event, or a device related event using the message-signaled interrupt programmed by the guest in the hypervisor capability.

In an example, the configuration space associated with the hypervisor may comprise a capability identifier assigned to all types of hypervisors or a vendor specific type of hypervisor. The capability identifier assigned to the hypervisor may comprise at least one of the size of the capability data structure, a version of the capability, a version of the hypervisor, or a type of the hypervisor.

Accordingly, an efficient method and system is provided that enables a hypervisor to have a communication channel with a guest driver associated with the device, while permitting the guest driver direct access to a device for programming of capabilities associated with the device with low overhead. The method described herein simplifies guest driver programming.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Peripheral Component Interconnect or PCI, is a local computer bus (also known as PCI Local Bus) for attaching hardware devices in a computer. The PCI bus supports the functions found on a processor bus, but in a standardized format that is independent of any particular processor. Devices connected to the bus are accessible to the processor, and are assigned addresses in an address space of the processor.

Peripheral Component Interconnect eXtended or PCI-X is a computer bus and expansion card standard that enhances the 32-bit PCI Local Bus for higher bandwidth demanded by servers. It is a double-wide version of PCI, running at up to four times the clock speed, but is otherwise similar in electrical implementation and uses the same protocol. PCI and PCI-X have been replaced by PCI Express or PCIe, with a completely different connector and a very different logical design.

Peripheral devices that employ PCI, PCI-X, or PCIe communicate with the processor to signal interrupts without asserting hardware pins of the processor or interrupt controller, or may be programmed by the processor using message-signaled interrupt (MSI or MSI-X (extended)) data structures. Message-signaled interrupts, in PCI 2.2 and later in PCI Express, are an alternative in-band method of signaling an interrupt. Traditionally, a device has an interrupt pin which it asserts when it wants to signal an interrupt to the host processing environment. This traditional form of interrupt signaling is an out-of-band form of control signaling since it uses a separate dedicated path relative to the main data path to send such control information. While PCI Express does not have separate interrupt pins, it has special in-band messages to allow it to emulate a pin assertion or de-assertion. Message Signaled Interrupts allow the device to write a small amount of data to a special memory-mapped I/O address. The chipset delivers the corresponding interrupt to a processor.

Rather than using a special message type reserved for interrupts, message-signaled interrupts usually use a memory write message type. PCI computer buses (including serial PCI express and PCI-X bus types) can use message-signaled interrupts.

PCI devices typically use special messages, called MSI or MSI-X capability structures, to allow operating system software to enable a device to assert an interrupt by means of a message-signaled interrupt. Message-signaled interrupts can allow the device to write a small amount of data to a special address in memory space (e.g., in a message capability register of a PIC). The PIC can deliver the corresponding interrupt to a CPU.

PCI defines two optional extensions to support message-signaled interrupts, MSI and MSI-X. While PCI software is compatible with legacy interrupts, it uses MSI or MSI-X. MSI (first defined in PCI 2.2) permits a device to allocate 1, 2, 4, 8, 16 or 32 interrupts. The device is programmed with an address to write to (e.g., the message address field/register of the message capability register of a PIC), and a 16-bit data word to identify the specific interrupt (e.g., the message data fields/registers of the message capability register of a PIC). The interrupt number is added to the data word to identify the interrupt. Some platforms such as Windows may not use 32 interrupts but rather use up to 16 interrupts.

MSI-X (first defined in PCI 3.0) permits a device to allocate up to 2048 interrupts. The address used by original MSI was found to be restrictive for some architectures. MSI-X allows for a larger number of interrupts and gives each one a separate target address and data word. Devices with MSI-X may not necessarily support 2048 interrupts but typically support at least 64 which is double the maximum MSI interrupts.

In addition to signaling interrupts from a peripheral device to a processor, a processor may transmit MSI or MSI-X messages over a PCI, PCI-X, or PCIe bus to program one or more configuration parameters, known as capabilities, in a PCI configuration space of PCI-based peripheral devices. PCI configuration space is the underlying way that processors inserted into PCI, PCI-X, or PCI Express-based motherboards perform auto configuration of the peripheral device cards inserted into a PCI bus of the motherboard. PCI devices have a set of registers referred to as a configuration space and PCI Express introduces extended configuration space for peripheral devices. Configuration space registers are mapped to device functions. Device drivers and diagnostic software may access the configuration spaces and operating systems have APIs to permit access to device configuration space.

PCI, PCI-X, or PCIe configuration space refers to a set of 256 bytes that are addressable by knowing the 8-bit PCI bus, 5-bit device, and 3-bit function numbers for the device (commonly referred to as the BDF bus/device/function). This permits up to 256 buses, each with up to 32 devices, each supporting 8 functions. A single PCI expansion card can respond as a device and may implement at least function number zero. The first 64 bytes of configuration space are standardized; the remainder is available for vendor-defined purposes.

In order to permit portions of configuration space to be standardized without conflicting with existing uses, there can be a list of capabilities defined within the first 192 bytes of PCI configuration space. Each capability has one byte that describes which capability it is, and one byte to point to the next capability. The number of additional bytes depends on a value of a capability identifier or capability ID. Traditionally, the capability ID may be set to 05 hex for MSI capabilities or for MSI-X capabilities.

FIG. 1 shows example formats of message-signaled interrupt (MSI) capability tables associated with 32-bit message address MSI (100a) and 64-bit message address MSI (100b) message structures used for programming PCI-based device capabilities. The message-signaled interrupt capability tables 100a, 100b may additionally be employed to permit a programmable interrupt controller (PIC, not shown) and/or a hypervisor to program/execute/read capabilities of PCI devices. Before a PCI device capability can be programmed/read/executed, the PCI device should be detected by the hypervisor and programmed by the hypervisor as to which memory range of the PIC to write message-signaled interrupts (MSIs) and how many and types of MSIs can be raised by the PCI device. This information may be programmed by the hypervisor through memory write transactions to the PCI device. The hypervisor may select the number of and types of MSI events that a PCI device can raise by specifying data in a MSI capability table 100a, 100b contained in its message-signaled interrupt capability register. The information contained in the MSI capability table 100a, 100b comprises a target memory address and the data values to be written to the target memory address.

For a PCI device, the fields of the message-signaled interrupt capability tables/registers 100a, 100b comprise a capability ID field 102a, 102b that identifies an MSI capable PCI device, and may be set to 05 hexadecimal for MSI. In an example, an unused capability identifier, e.g., 20 hexadecimal, may be employed for identifying the hypervisor; a pointer to the next capability (e.g., a capability unrelated to the MSI functionality) in the capability list 104a, 104b; a message control register 106a, 106b which comprises an MSI enable bit for masking/enabling/disabling the raising of MSI messages and fields for indicating whether the device is multiple message capable/enabled and/or 64 bit address capable; a message address register 108a (and 108b for 64 bit message enabled devices) operable to contain the address of the memory write of the PIC used when a device delivers an interrupt request to the PCI to cause an interrupt to the hypervisor; and a message data register 110a, 110b to contain data identifying a specific interrupt type.

At boot time, configuration software of a hypervisor can detect and program each PCI-capable device using an MSI capability table. The configuration software scans the PCI bus(es) and discovers devices. When a PCI express device is discovered, the configuration software reads the capability list pointer 104a, 104b to obtain the location of the first capability register within a chain of registers. The software searches the capability register sets until it discovers an MSI capability register set (Capability ID of 05 hexadecimal, or an unused value for the hypervisor (e.g., 20 hexadecimal)). The configuration software then assigns a memory address to the device's message address register 108a, 108b. If an MSI-X capability is used, it is programmed using an on-device MSI-X capability and MSI-X table structure (not shown). The configuration software then allocates a number of messages equal to or less than the number of configurations or capabilities that the device supports. The configuration software writes a base message data patterns into the device's message data register 110a, 110b. Finally, the configuration software sets the MSI enable bit in the devices message control register 106a, 106b, thereby enabling the device to generate interrupts using MSI memory writes.

FIG. 2 is a block diagram that illustrates an example computing system 200 in which examples of the present disclosure may operate. The computing system 200 hosts one or more virtual machines (VMs) 205. The virtual machine 205 runs a guest (e.g., guest 210) that uses a guest operating system 215 to manage its resources. The virtual machines 205 may run the same or different guest operating systems, such as Microsoft Windows®, Linux®, Solaris®, Mac® OS, etc. The computing system 200 may be a server, a workstation, a personal computer (PC), a mobile phone, a palm-sized computing device, a personal digital assistant (PDA), etc.

Throughout the following description, the term "guest" refers to the computer readable instructions run on the hypervisor 245 that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest 210, etc.

In one example, the computing system 200 runs a hypervisor 245 to virtualize or expose access to underlying host hardware (e.g., the devices 260a-260n) of a host 230, making the use of the virtual machine 205 transparent to the guest 210 and the users of the computing system 200. In one example, the hypervisor 245 may support the virtual machine 205. In one example, the hypervisor 245 is part of a host operating system (OS) 125 of the host 230.

In one example, the computing system 200 also includes hardware components (host hardware) including a host central processing unit (CPU) 235. The computing system 200 may also include host memory, message-signaled interrupt based devices 260a-260n and other hardware devices 260a-260n The guest 210 may be configured to load device-specific modules (guest device drivers) 220a-220n for access to the message-signaled interrupt based devices 260a-260n and other hardware devices 260a-260n.

In a virtualized environment, a virtual machine 205 may not have direct access to the physical devices 260a-260n. Control of the message-signaled interrupt capability table of a physical device (e.g., 260a) may be indirectly handled by the intervening hypervisor 245. A device assignment capability manager 250 running on the hypervisor 245 of the host CPU 235 is configured to detect the request (e.g., by a hypervisor administrator (not shown) or by the guest 210) to expose physical devices (e.g., 260b) to the guest 210 and to maintain a listing of exposed devices, device capabilities, and message address registers of the exposed devices (e.g., 260b) in a device assignment capability table 255. The device assignment capability manager 250 of the hypervisor 245 is further configured to locate free space in a configuration space of the device (e.g., 260b). The device assignment capability manager 250 is configured to assign a configuration space associated with the hypervisor 245 to the located free space. The device assignment capability manager 250 is configured to notify the guest 210 of the configuration space associated with the hypervisor 245 and a range of addresses associated with the free space. The configuration space associated with the hypervisor 245 may comprise a message-signaled capability associated with the hypervisor. The device assignment capability manager 250 is further configured to assign a capability identifier that identifies the hypervisor 245. The device assignment capability manager 250 is configured to assign a capability of the hypervisor to the free space in both a device capability table (not shown) of a device (e.g., 260b) and the device assignment capability table 255 of the hypervisor.

The (free) configuration space may be, but is not limited to, PCI configuration space or PCI express extended configuration space In another example, the configuration space and corresponding capabilities may be a vendor-specific configuration space/capabilities, power management configuration space/capabilities, etc.

In an example, the hypervisor 245 may be configured to expose the device (e.g., 260b) to the guest 210, e.g., on hypervisor startup.

FIG. 3A shows a device capability table 300 corresponding to the message-signaled interrupt capability tables 100a, 100b corresponding to used configuration space 316 and unused configuration space 317 of an individual device (e.g., 260b). In an example, the device assignment capability manager 250 of the hypervisor 245 may be configured to employ the table 300 to manage the device capability designations and assignments to permit pass-through accesses to physical devices (e.g., 260a-260n) by the guest 210. The hypervisor 245 may read/write data from/to the device capability table 300 to permit the guest 210 to access the device (e.g., 260b) through the hypervisor 245 using device assignment. In this example, the device assignment capability manager 250 of the hypervisor 245 may assign a capability (e.g., an MSI or MSI-X structure/vector) to the portion of free configuration space 317 located by the hypervisor 245 in the device capability table 300. In an example, the hypervisor 245 may determine an unused capability in the unused configuration space 317 of the device (e.g., 260b) in the device capability table 300. In an example, determining an unused capability may comprise the hypervisor 245 loading a device-specific module (not shown) and scanning the unused configuration space 317 of the device (e.g., 260b) pointed to by the device-specific module. An unused capability may be determined when the device assignment capability manager 155 of the hypervisor 245 receives a list of configuration space addresses used by the device (e.g., 260b) from the device-specific module (e.g., the device driver 220a), and locates a consecutive range of addresses not overlapping any addresses listed by the device-specific module that is also large enough to include the hypervisor capability.

In an example, the device assignment capability manager 255 of the hypervisor 245 may assign an unused capability identifier 305n (e.g., 20 hexadecimal) corresponding to the hypervisor 245 in the unused configuration space 317 of the device (e.g., 260b) in the device capability table 300. The capability identifier (e.g. 305n) associated with the hypervisor 245 may designate all types of hypervisors or may be hypervisor vendor specific (e.g., KVM™, VMware™, etc.). The capability identifier (e.g. 305n) associated with the hypervisor 245 (e.g., 20 hexadecimal) may comprise at least one of a size of the capability data structure, a version of the capability, a version of the hypervisor 245, or a type of the hypervisor 245.

For PCI and PCI-express devices, the configuration space 316, 317 of the device (e.g., 260b) may be structured as a linked list of capability structures/vectors. In one example, the hypervisor 245 may determine an unused capability structure (e.g., 319n) in the unused configuration space 317 of the device (e.g., 260b) by inserting a capability of the hypervisor 245 in the linked list of capability structures 319a-319z associated with the configuration space 316, 317 of the device (e.g., 260b). In one example, inserting a capability of the hypervisor 245 in the linked list of capability structures 319a-319z associated with the configuration space 316, 317 of the device (e.g., 260b) may comprise the hypervisor 245 traversing though the capability linked list associated with the configuration space 316, 317 of the device (e.g., 260b), respectively, until a termination identifier (e.g., NULL or 0) of the linked list is found and replacing the termination identifier in the configuration space of the device (e.g., 260b) exposed to the guest 210 with pointer to the capability of the hypervisor 245. In another example, the capability of the hypervisor 245 may be inserted in the linked list anywhere in the list including an end opposite the termination identifier.

FIG. 3B shows an example 302 of a device assignment capability table 255 that hypervisor 245 may maintain corresponding to a plurality of devices (e.g., 260a-260n). In an example, the device assignment capability manager 250 of the hypervisor 245 may store device identifiers 320a-320n associated with the devices (e.g., 260a-260n) that may employ device assignment, corresponding device capability identifiers 325a-325n, and a range of corresponding message addresses registers 330a-330b associated with the free space 317 in a corresponding device assignment capability tables 255. The device assignment capability table 255 permits the hypervisor 245 to maintain associations between the hypervisor 245 and the devices 260a-260n to permit the hypervisor 245 to execute hypervisor-specific actions on one or more of the devices 260a-260n using the capability memory locations (e.g., the message address registers 330a-330n) of the devices 260a-260n.

Figure 4:
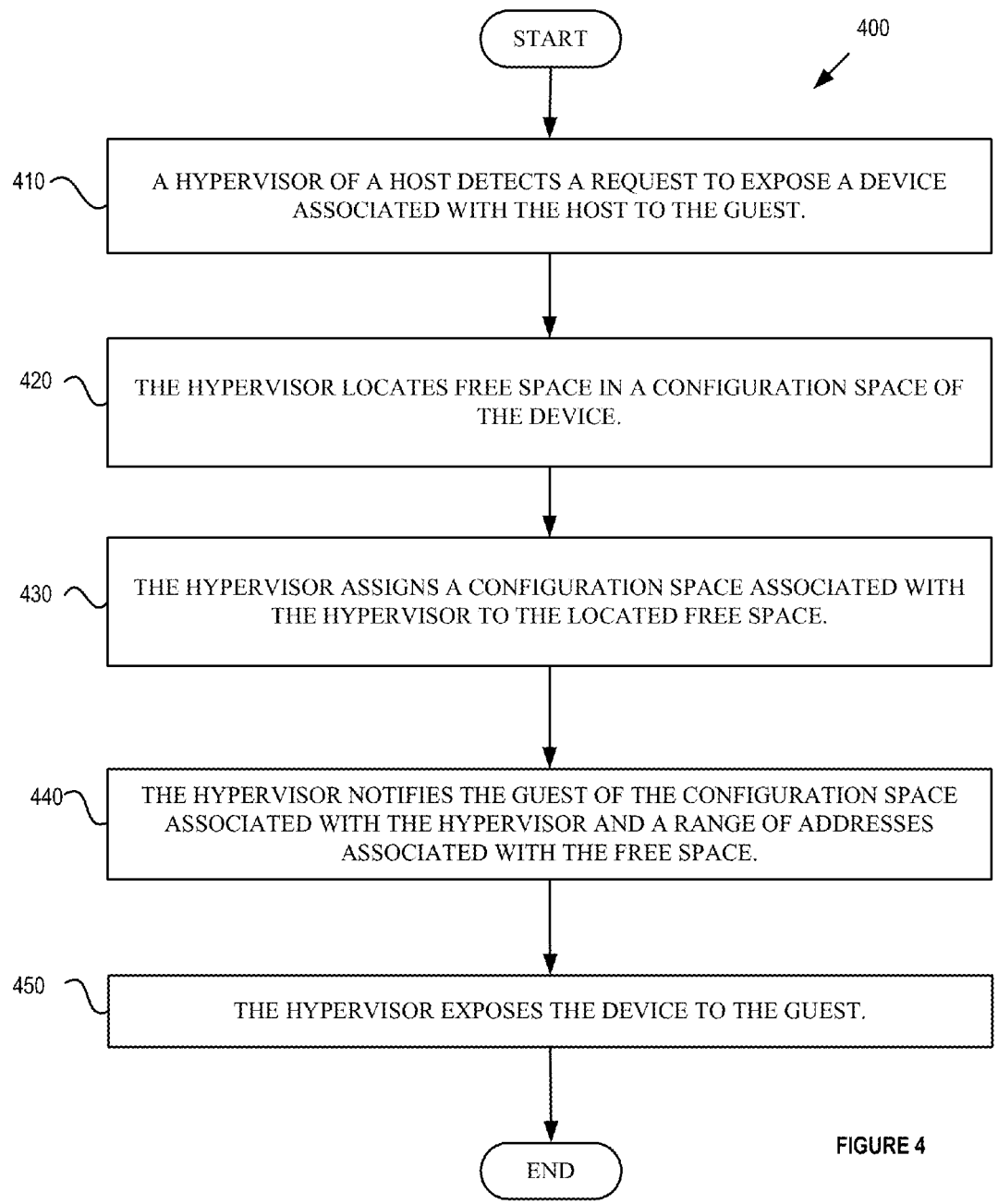
FIG. 4 is a flow diagram illustrating an example of a method for permitting a guest device driver to have a communication channel with a hypervisor associated with a device and to have direct access to a physical device though the hypervisor.

FIG. 4 is a flow diagram illustrating an example of a method 400 for permitting a guest 210 to have direct access to a physical device (e.g., 260b)). The method 400 may be performed by a computer system 200 of FIG. 2 and may comprise hardware (e.g., circuitry, dedicated logic, programmable logic, microcode, etc.), software (e.g., instructions run on a processing device), or a combination thereof. In one example, the method 400 is performed by the device assignment capability manager 250 of the hypervisor 245 of the host 230 of FIG. 2. As shown in FIG. 4, at block 410, the hypervisor 245 of the host 230 detects a request (e.g., by a hypervisor administrator (not shown) or the guest 210) to expose a device (e.g., 260*b*) associated with the host 230 to the guest 210. In an example, the device (e.g., 260*b*) may comprise a physical PCI device associated with the host 230. In an example, the configuration space 300 may be PCI configuration space or PCI express extended configuration space populated with MSI or MSIX capability structures.

At block 420, the hypervisor 245 locates the free space 317 in a configuration space 300 of the device (e.g., 265*b*).

At block 430, the hypervisor 245 assigns a configuration space associated with the hypervisor 245 to the located free space. The configuration space associated with the hypervisor 245 may be a message-signaled interrupt capability associated with the hypervisor 245. The hypervisor may further assign a capability identifier (e.g. 305*n*) associated with the hypervisor 245 to a portion of the located free space 317.

In an example, the hypervisor 245 may assign a capability (e.g., an MSI or MSI-X structure) of the hypervisor 245 to the portion of the located free space 317. In an example, the hypervisor 245 may determine an unused capability in the configuration space 316, 317 of the device (e.g., 260*b*). In an example, determining an unused capability may comprise the hypervisor 245 loading a device-specific module and scanning the configuration space 316, 317 of the device (e.g., 260*b*) pointed to by the device-specific module (e.g., the guest device driver 220*b*). As used herein, a device-specific module is a driver that understands a device (e.g., 260*b*) and can be loaded to determine free areas of configuration space when an associated device type does not architect a generic means to discover the free areas of configuration space. This is in contrast to PCI, which does provide a generic means of discovery of free areas of configuration space. An unused capability may be determined when the hypervisor 245 receives a list of configuration space addresses used by the device (e.g., 260*b*) from the device-specific module (e.g., the guest device driver 220*b*), and locating a consecutive range of addresses not overlapping any addresses listed by the device-specific module (e.g., the guest device driver 220*b*) that is also large enough to include the hypervisor capability.

In an example, the capability identifier (e.g. 305*n*) associated with the hypervisor 245 may be assigned to all types of hypervisors or may be hypervisor vendor specific (e.g., KVM™, VMware™, etc.). The capability identifier (e.g. 305*n*) associated with the hypervisor 245 may comprise at least one of a length of the capability, a version of the capability, a version of the hypervisor 245, or a type of the hypervisor 245.

At block 440, the hypervisor 245 notifies the guest 210 of the configuration space associated with the hypervisor 245 and a range of addresses (e.g., 310*n*-310*z*) associated with the free space 317. The configuration space associated with the hypervisor 245 may comprise a message-signaled capability associated with the hypervisor 245. At block 450, the hypervisor 245 exposes the device (e.g., 260*b*) to the guest 210. In an example, the hypervisor 245 may expose the device (e.g., 260*b*) to the guest 210 on hypervisor startup. For PCI and PCI-express devices, the configuration space 316, 317 of the device (e.g., 260*b*) is configured as a linked list of capability structures. In one example, the hypervisor 245 may determine an unused capability in the configuration space 316, 317 of the device (e.g., 260*b*) by inserting a capability of the hypervisor 245 in the linked list of capability structures 319*a*-319*z* associated with the configuration space 316, 317 of the device (e.g., 260*b*). In one example, inserting a capability of the hypervisor 245 in the linked list of capability structures 319*a*-319*z* associated with the configuration space 316, 317 of the device (e.g., 260*b*) may comprise the hypervisor 245 traversing though the capability linked list associated with the configuration space 316, 317 of the device (e.g., 260*b*) until a termination identifier (e.g., NULL or 0) of the linked list is found. The hypervisor 245 may replace the termination identifier in the configuration space of the device (e.g., 260*b*) exposed to the guest 210 with pointer to the capability of the hypervisor 245. In another example, the capability of the hypervisor 245 may be inserted in the linked list anywhere in the list including an end opposite the termination identifier.

In an example, the device assignment capability manager 250 of the hypervisor 245 may store device identifiers 320*a*-320*n*, corresponding device capability identifiers 325*a*-325*n*, and a range of message address registers 330*a*-330*n* associated with the free space 317 in a corresponding device assignment capability tables 255. The device assignment capability table 255 permits the hypervisor 245 to maintain associations between the hypervisor 245 and the devices 260*a*-260*n* to permit the hypervisor 245 to execute hypervisor-specific actions on one or more of the devices 260*a*-260*n* using the capability memory locations (e.g., the message address registers 330*a*-330*n*) of the devices 260*a*-260*n*.

In an example, the hypervisor-specific instruction may provide a two-way communication channel between the guest device driver (e.g., 220*b*) and the hypervisor 245. In a guest-to-device direction, in an example, the guest device driver (e.g., 220*b*) is permitted assigned/direct access to the devices 260*a*-260*n* by first transmitting an MSI/MSI-X message comprising a capability of a device (e.g., 260*b*) to the hypervisor 245. In an example, the hypervisor 245 intercepts a write by the guest device driver (e.g., 220*b*) to the range of addresses associated with the free space 317. In response to intercepting a write by the guest device driver (e.g., 220*b*) to the range of addresses associated with the free space 317, the hypervisor 245 may execute a hypervisor-specific instruction to the range of addresses associated with the free space 317. The hypervisor-specific instruction may be an operation associated with the device or a message to be transmitted to the guest device driver (e.g., 220*b*).

The hypervisor 245 checks the device assignment capability table 255 to determine if a hypervisor-specific message is to be passed to the guest 210 and/or an execution of a hypervisor-specific command is to be executed on one or more of the devices 260*a*-260*n* including the device 260*b* before permitting assigned/direct access to the device (e.g., 260*b*). Once the hypervisor 245 has permitted access to the device (e.g., 260*b*), the hypervisor 245 executes a hypervisor-specific command on a device (e.g., 260*b*). In an example, before the guest 210 is permitted assigned/direct access to the devices 260*a*-260*n*, the hypervisor 245 may disable ordinary hypervisor pass-through access for a specified range of device addresses to guarantee an exit from the guest 210 to the hypervisor 245.

In the device-to-guest direction, in an example, the hypervisor 245 may expose the guest 210 to at least one more message-signaled interrupt vector (e.g., 319*n*) a reserved set of message-signaled interrupt vectors (e.g., 319*m*) in the unused configuration space 317 of the device (e.g., 260*b*). Accordingly, upon at least one of a hypervisor-related event, a host related event, or a device related event, the hypervisor 245 can detect that the message-signaled interrupt was enabled by the guest device driver, and notify the guest 210 about at least one of a hypervisor-related event, a host related event, or a device related event using the message-signaled interrupt programmed by the guest 210 in the hypervisor capability.

Figure 5:
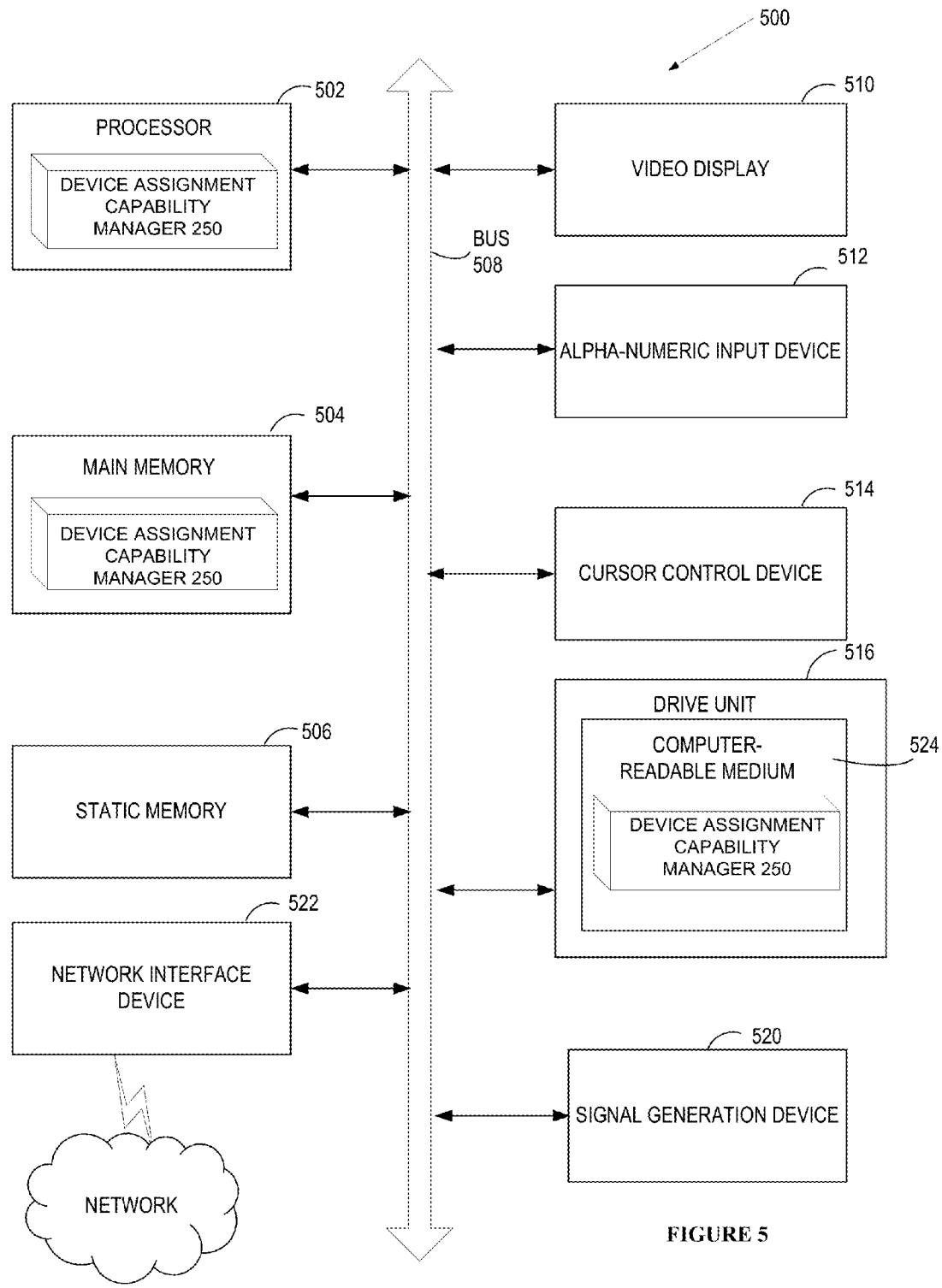
FIG. 5 illustrates a diagrammatic representation of a machine in the example form of a computer system within which a set of instructions, for causing the machine to perform any one or more of the methodologies discussed herein, may be executed.

FIG. 5 illustrates a diagrammatic representation of a machine in the example form of a computer system 500 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The device assignment capability manager 250 shown in FIG. 2 may be executed by processor 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the device assignment capability manager 250) embodying any one or more of the methodologies or functions described herein. The instructions of the device assignment capability manager 250 may also reside, completely or at least partially, within the main memory 504 and/or within the processor 502 during execution thereof by the computer system 500, the main memory 504 and the processor 502 also constituting computer-readable media. The instructions of the device assignment capability manager 250 may further be transmitted or received over a network via the network interface device 522.

While the computer-readable storage medium 524 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   detecting, by a processor executing a hypervisor of a host, a request by a guest to expose a device of the host to the guest to provide paravirtualization capability to access the device;
   locating, by the processor executing the hypervisor, free space in a configuration space of the device;
   assigning, by the processor executing the hypervisor, a configuration space associated with the hypervisor to the located free space; and
   notifying the guest, by the processor executing the hypervisor, of the configuration space associated with the hypervisor and a range of addresses associated with the free space.

2. The method of claim 1, further comprising exposing, by the hypervisor, the device to the guest.

3. The method of claim 1, wherein the configuration space associated with the hypervisor comprises a message-signaled capability associated with the hypervisor.

4. The method of claim 3, further comprising determining an unused capability in the configuration space of the device.

5. The method of claim 4, wherein determining an unused capability comprises loading a device-specific module in the hypervisor and scanning configuration space of the device pointed to by the device-specific module.

6. The method of claim 2, wherein notifying the guest comprises inserting a capability of the hypervisor in a linked list of capabilities associated with the configuration space of the device exposed to the guest.

7. The method of claim 6, wherein inserting a capability of the hypervisor in a linked list of capabilities associated with the configuration space of the device comprises:
   traversing though the capability linked list associated with the configuration space of the device until a termination identifier of the linked list is found; and replacing the termination identifier in the configuration space of the device exposed to the guest with pointer to the capability of the hypervisor.

8. The method of claim 1, wherein the hypervisor intercepts an access by the guest to the range of addresses associated with the hypervisor.

9. The method of claim 8, wherein the hypervisor executes a hypervisor-specific instruction in response to intercepting an access by the guest to the range of addresses associated with the hypervisor.

10. The method of claim 9, wherein the hypervisor-specific instruction executes an operation associated with the device.

11. The method of claim 10, wherein the hypervisor-specific instruction provides a communication channel between the guest and the hypervisor.

12. The method of claim 1, wherein a hypervisor capability is apportioned into at least one message-signaled interrupt vector.

13. The method of claim 12, further comprising:
   exposing the guest to at least one more message-signaled interrupt vector for use with the hypervisor beyond a reserved set of message-signaled interrupt vectors in the configuration space of the device.

14. The method of claim 13, wherein in response to an access of the at least one more message-signaled interrupt vector, the hypervisor intercepts the access and enables the message-signaled interrupt vector, and wherein in response to at least one of a hypervisor-related event, a host related event, or a device related event, the hypervisor detects that the message-signaled interrupt is enabled, and notifies the guest about at least one of a hypervisor-related event, a host related event, or a device related event using the at least one message-signaled interrupt.

15. The method of claim 1, wherein the configuration space associated with the hypervisor comprises a capability identifier assigned to all types of hypervisors or a vendor specific type of hypervisor.

16. The method of claim 15, wherein the capability identifier assigned to the hypervisor comprises at least one of a size of a capability data structure, a version of a capability, a version of the hypervisor, or a type of the hypervisor.

17. A computer system comprising:
   a memory;
   a host CPU, coupled to the memory; and
   a hypervisor hosted by the computer system, having access to the memory and use of the host CPU, the hypervisor to:
      detect a request by a guest to expose a device associated with the host to the guest to provide paravirtualization capability to access the device;
      locate free space in a configuration space of the device;
      assign a configuration space associated with the hypervisor to the located free space; and
      notify the guest of the configuration space associated with the hypervisor and a range of addresses associated with the free space.

18. The system of claim 17, wherein the hypervisor is further to expose the device to the guest.

19. A non-transitory computer-readable storage medium including instructions that, when accessed by a processor, cause the processor to:
   detect, by the processor executing a hypervisor of a host, a request by a guest to expose a device associated with the host to the guest to provide paravirtualization capability to access the device;
   locate, by the processor executing the hypervisor, free space in a configuration space of the device;
   assign, by the processor executing the hypervisor, a configuration space associated with the hypervisor to the located free space; and
   notify the guest, by the processor executing the hypervisor, of the configuration space associated with the hypervisor and a range of addresses associated with the free space.

20. The non-transitory computer-readable storage medium of claim 19, wherein the processor further to expose the device to the guest.

* * * * *